J. E. McLEOD.
RESILIENT REAR WHEEL FORK FOR MOTOR CYCLES.
APPLICATION FILED JAN. 24, 1913. RENEWED MAY 26, 1915.
1,147,415.
Patented July 20, 1915.
2 SHEETS—SHEET 1.
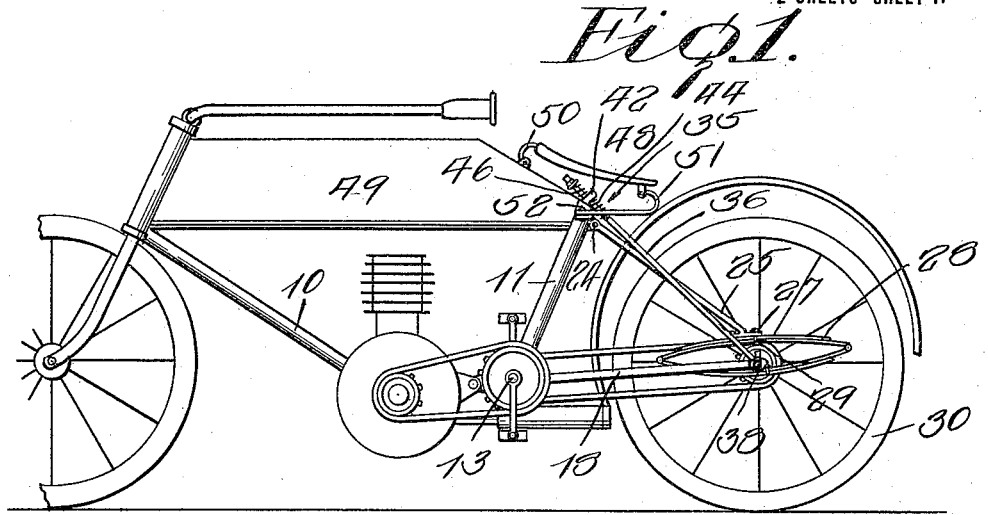
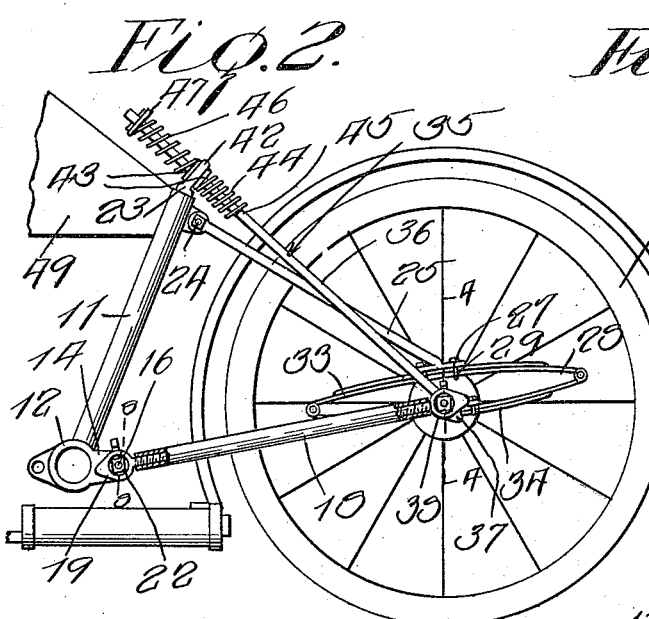
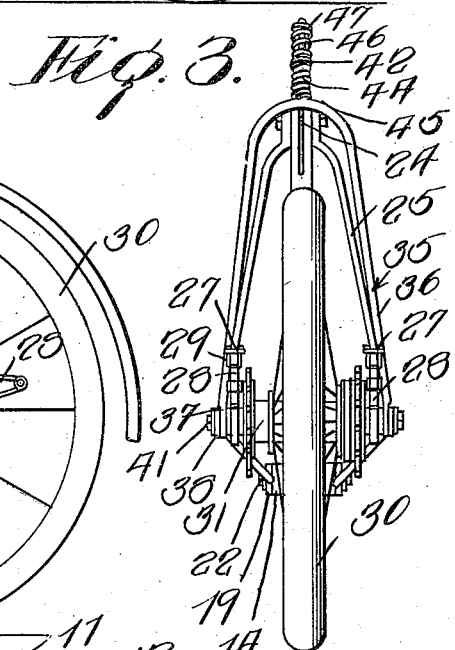
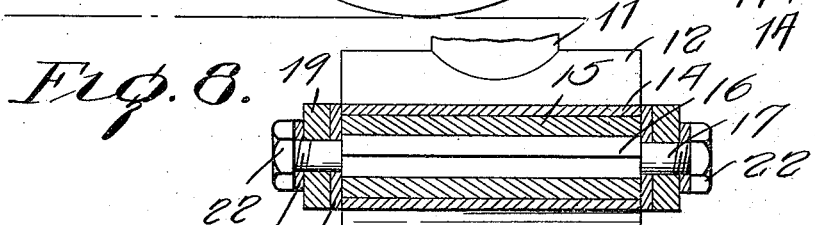
Witnesses
B. L. Brann
Francis Boyle
Inventor
J. E. McLeod
By Chandler Chandler
Attorneys

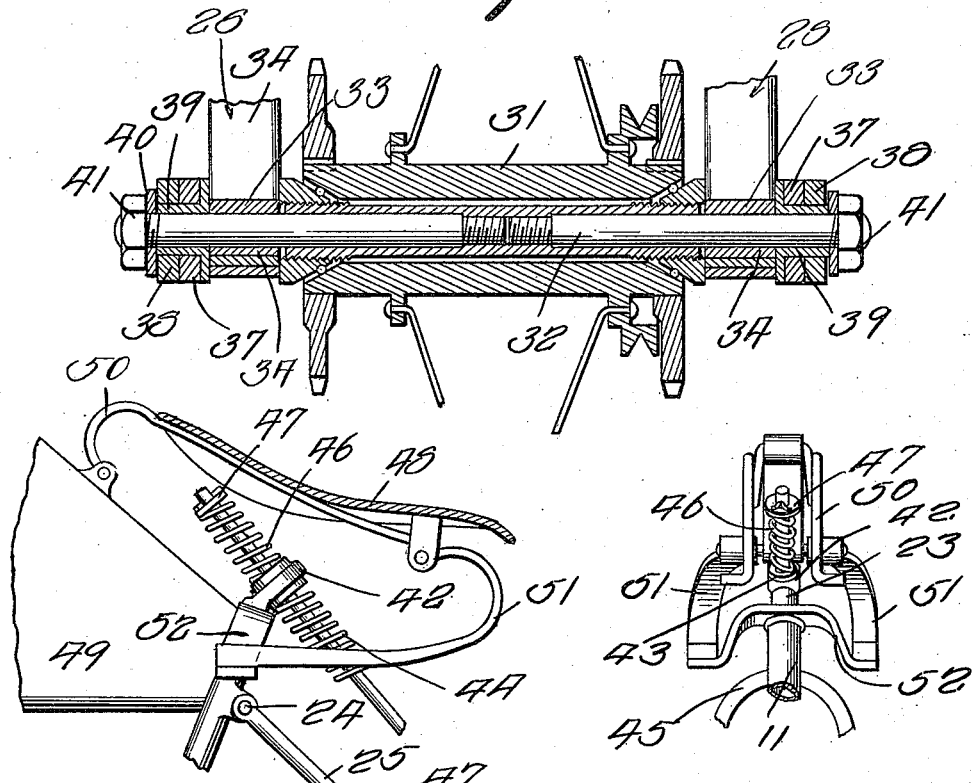

UNITED STATES PATENT OFFICE.

JOHN E. McLEOD, OF WASHINGTON, KANSAS.

RESILIENT REAR-WHEEL FORK FOR MOTOR-CYCLES.

1,147,415.　　　　　Specification of Letters Patent.　　Patented July 20, 1915.

Application filed January 24, 1913, Serial No. 744,004. Renewed May 26, 1915. Serial No. 30,689.

*To all whom it may concern:*

Be it known that I, JOHN E. McLEOD, a citizen of the United States, residing at Washington, in the county of Washington, State of Kansas, have invented certain new and useful Improvements in Resilient Rear-Wheel Forks for Motor-Cycles; and I do hereby declare the following to be a full, clear, and exact description of the invention, such as will enable others skilled in the art to which it appertains to make and use the same.

This invention relates to shock absorbers and has for its principal object to provide an improved attachment for motorcycles which will serve to take up the jar of the rear wheel passing over inequalities in the road.

A further object of the invention is to provide improved mounting for the rear wheels of motorcycles which with slight changes may be employed upon other wheeled vehicles, and which when used upon a motorcycle will allow the rear wheel to yield without loosening the drive.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of a motorcycle embodying my improvements. Fig. 2 is a side elevation with the rear wheel in one position of yielding movement. Fig. 3 is a rear elevation. Fig. 4 is a vertical sectional view taken on the line 4—4 Fig. 2. Fig. 5 is a fragmentary view in elevation with the seat in longitudinal section. Fig. 6 is a front elevation of the parts shown in Fig. 5. Fig. 7 is a longitudinal sectional view of the parts shown in Fig. 5. Fig. 8 is a cross sectional view taken on the line 8—8 Fig. 2.

Referring now to the drawings in which like characters of reference designate similar parts, 10 designates the frame of a motorcycle the same including in its construction a rear tubular drop bar 11 which carries a hanger shell 12 that supports the pedal crank shaft 13, these parts being of usual construction and function.

The shell is formed with a bearing box 14 on the rear side, and within this box is mounted a tubular bearing 15 having a square bore within which is disposed a bolt 16 of square cross section, the bolt being provided with reduced terminal extensions 17. A pair of lower brace arms 18 are each provided at the forward end with an eye 19 which receives the corresponding extension 17 of the bolt, a washer 20 being disposed on said extension between the eye and the bolt and a second washer 21 being disposed between the eye and a clamp nut 22 which is threaded on to the outer end of the extension. The arms are thus removably secured to the bearing which being revolubly mounted in the box permits of the arms swinging up at the free ends.

A seat post 23 is passed into the upper end of the rear drop bar 11 and is secured to the latter by means of a transverse pin 24. A pair of rear tubular brace arms 25 are provided each at the upper end with an eye which receives the related end of the pin 24, there being a nut 26 on the pin to clamp the arm to the drop bar. Each brace arm 25 is provided at the lower end with a leaf 27 to which is clamped an elliptical spring 28 of that type generally used in buggies and the like, U-bolts 29 straddling the ends of the leaf 27 and the upper member of the elliptical spring 28 to secure the spring to the arm.

The rear wheel 30 is interposed between the rear brace arms 25 and elliptical springs 28 carried thereby, the wheel having a hub shown conventionally at 31, from which the ends of the spindle 32 project. The ends of the spindle are inserted between the uppermost leaf 33 and next underlying leaf 34 of the lower member of the adjacent elliptical spring. Such connection between the spindle and springs is made in rear of the center of the lower member of each spring so that the springs normally slope forwardly as shown.

A supplemental fork 35 is provided, the arms 36 of this fork passing across the rear brace arms 25 and straddling the rear wheel. The fork arms are terminally equipped with screw eyes 37 and the rear ends of the lower brace arms 18 are also equipped with screw eyes 38 which bear upon and register with the screw eyes 37. A bushing 39 surrounds each end of the spindle 32 and passes through the adjacent registering eyes 37 and 38, and is held against the elliptical spring by a washer 40 and nut 41 carried on the spindle, as clearly shown in Fig. 4.

The upper end of the supplemental fork stem is passed loosely through a rearwardly inclined eye 42 formed on the seat post 23, and a pair of nipple washers 43 snugly fit in the eye and surround the fork loosely. A helical spring 44 is seated on the fork stem and is confined between the shoulder 45 of the fork and lowermost of the nipple washers. A helical spring 46 is seated on the stem above the seat post eye and is confined between a collar 47 on the stem and uppermost of the nipple washers. Upon the rear wheel passing over inequalities in the roadbed, the lower member of each elliptical spring 27 will yield as will also both of the helical springs 44 and 46 with a resultant cushioning of the frame 10.

The seat 48 is of such contour as to conceal the stem and helical springs of the supplemental fork and is secured at the forward end to the gasolene reservoir 49 by a spring 50, and is provided at the rear end with an attaching arm 51 on each side which is terminally secured to the end of a transversely disposed bar 52 that is fixed to the seat post 23 below the eye 42 thereof. The yielding of the supplemental fork is thus unobstructed since the seat simply houses the stem of the fork and is connected to the seat post below the fork stem as described.

What is claimed, is:—

1. The combination with the rear brace arms of a motorcycle, of elliptical springs having the upper members secured to the lower ends of said brace arms, lower brace arms having the rear ends secured to the lower members of said elliptical springs, a seat post, and a supplemental fork having the arms secured to the lower members of said elliptical springs and having the stem yieldably connected to said seat post.

2. The combination with the rear brace arms of a motorcycle, of elliptical springs having the upper members secured to the lower ends of said brace arms, a rear ground wheel, a spindle for said ground wheel secured to the lower members of said elliptical springs, lower brace arms secured at the rear ends to said spindle, a seat post, a supplemental fork having the arms secured to the ends of said spindle, and a yielding connection between said supplemental fork and said seat post.

3. The combination with the rear brace arms of a motorcycle, of elliptical springs having their upper members secured to the lower ends of said brace arms, a ground wheel having a spindle passed through the lower members of said elliptical springs in rear of the centers of the latter whereby said springs slope forwardly, swinging lower brace arms having their rear ends connected to said spindle, a supplemental fork having the arms terminally connected to said spindle, a seat post, the stem of said supplemental fork passing through said seat post loosely and being adapted to vibrate therethrough, and helical springs on said stem on opposite sides of said seat post cushioning the vibratory movement of said supplemental fork.

In testimony whereof, I affix my signature, in the presence of two witnesses.

JOHN E. McLEOD.

Witnesses:
 EDO ERPS,
 GEORGE BRANT.

Copies of this patent may be obtained for five cents each, by addressing the "Commissioner of Patents, Washington, D. C."